(12) United States Patent
Ishikawa

(10) Patent No.: US 12,470,914 B2
(45) Date of Patent: Nov. 11, 2025

(54) WARNING ABOUT WIRELESS COMMUNICATION FOR INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/365,570

(22) Filed: Aug. 4, 2023

(65) Prior Publication Data

US 2024/0056801 A1   Feb. 15, 2024

(30) Foreign Application Priority Data

Aug. 9, 2022 (JP) ................ 2022-126814
May 24, 2023 (JP) ................ 2023-085181

(51) Int. Cl.
*H04W 12/03* (2021.01)
*H04L 9/40* (2022.01)

(52) U.S. Cl.
CPC ......... *H04W 12/03* (2021.01); *H04L 63/0428* (2013.01); *H04L 63/20* (2013.01)

(58) Field of Classification Search
CPC ..... H04W 12/30; H04L 63/0428; H04L 63/20
USPC .......................................... 380/270
See application file for complete search history.

(56) References Cited

U.S. PATENT DOCUMENTS

| | | | | |
|---|---|---|---|---|
| 7,769,837 B2* | 8/2010 | Nogawa | ............... | H04W 8/22 709/228 |
| 8,041,319 B2* | 10/2011 | He | ............... | H04W 36/008375 709/227 |
| 9,826,352 B2* | 11/2017 | Rabb | ............... | G08B 29/24 |
| 2005/0052404 A1* | 3/2005 | Kim | ............... | G09G 3/005 345/108 |

(Continued)

FOREIGN PATENT DOCUMENTS

JP   2016208448 A   12/2016

*Primary Examiner* — Dant B Shaifer Harriman
(74) *Attorney, Agent, or Firm* — Canon U.S.A., Inc. IP Division

(57) ABSTRACT

An information processing apparatus that performs wireless communication with an external apparatus includes one or more memories, and one or more processors in communication with the one or more memories, wherein the one or more memories and the one or more processors are configured to receive selection of one environment from a plurality of environments as a use environment of the information processing apparatus, and perform notification of a warning regarding a setting of wireless communication, in a case where the selected environment is one of predetermined environments and the setting with a relatively low security strength among settings for encryption processing for the wireless communication is set, and not to perform the notification of the warning in a case where the predetermined environment is not selected, wherein the predetermined environments include a work-at-home environment, a co-working space environment, a shared office environment, and a Wi-Fi hot spot environment.

18 Claims, 9 Drawing Sheets

(56) References Cited

U.S. PATENT DOCUMENTS

| | | | | |
|---|---|---|---|---|
| 2011/0185408 A1* | 7/2011 | Travis | ................... | G06F 21/32 |
| | | | | 726/23 |
| 2012/0019674 A1* | 1/2012 | Ohnishi | ................ | G08C 17/00 |
| | | | | 348/207.1 |
| 2013/0152183 A1* | 6/2013 | Plewnia | ................ | H04L 63/08 |
| | | | | 726/7 |
| 2014/0029436 A1* | 1/2014 | Boc | ..................... | H04L 47/125 |
| | | | | 370/236 |
| 2014/0337841 A1* | 11/2014 | Hyde | .............. | H04W 52/0229 |
| | | | | 455/418 |
| 2015/0074392 A1* | 3/2015 | Boivie | .............. | G06F 21/6245 |
| | | | | 713/164 |
| 2017/0324817 A1* | 11/2017 | Oliveira | ................ | H04L 67/10 |
| 2018/0041865 A1* | 2/2018 | Rabb | ..................... | G08B 29/24 |
| 2018/0176845 A1* | 6/2018 | Visuri | ................ | H04W 36/22 |
| 2020/0217536 A1* | 7/2020 | Guan | ...................... | F24F 11/52 |
| 2024/0063830 A1* | 2/2024 | Klies | ................ | H04W 74/002 |
| 2024/0179607 A1* | 5/2024 | Takayoshi | ............ | H04W 40/16 |

\* cited by examiner

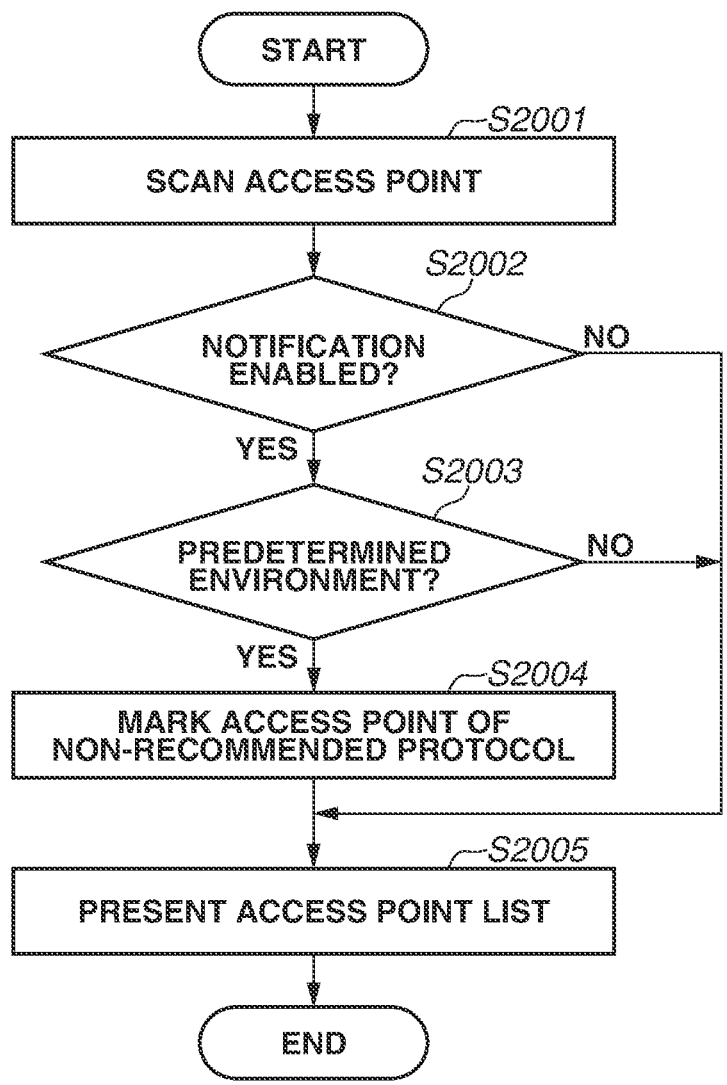

WARNING ABOUT WIRELESS COMMUNICATION FOR INFORMATION PROCESSING APPARATUS, CONTROL METHOD FOR INFORMATION PROCESSING APPARATUS, AND STORAGE MEDIUM

BACKGROUND

Field

The present disclosure relates to an improvement in security of an information processing apparatus used in various environments.

Description of the Related Art

An information processing apparatus connected to a network can be safely used by installing various security functions such as an encryption technique. In a case where communication is performed in an infrastructure mode of a wireless local area network (LAN), the information processing apparatus implements communication by connecting to a wireless access point. At this time, an encryption method on a communication path is determined by an agreement between the information processing apparatus and the wireless access point, thereby taking measures to prevent communication contents from being leaked on the path. Both the information processing apparatus and the wireless access point needs to support an available encryption method. Even when the information processing apparatus is compatible with the latest strong encryption method, if the wireless access point is not compatible with the latest strong encryption method, a conventional encryption method with lower strength is to be used.

Currently, wireless local area network (LAN) encryption methods generally used in information processing apparatuses are protocols such as Wired Equivalent Privacy (WEP), Wi-Fi Protected Access® (WPA™) WPA2™ and WPA3™. Of these, methods of decryption for WEP and WPA™ have been known to date for reasons such as weak encryption strength and partial vulnerability, and the governments and security agencies in various countries have called attention not to recommend their use. Further, using no encryption is also selectable as a communication method, but is not recommended as a matter of course.

Japanese Patent Application Laid-Open No. 2016-208448 discloses a technique of displaying a warning when a user uses an encryption method having a low security strength in a case where the user has set an information processing apparatus to prohibit the use of an encryption method having a low security strength.

However, in Japanese Patent Application Laid-Open No. 2016-208448, for example, an appropriate notification sufficiently considering the use environment of the information processing apparatus, such as a condition unique to a specific use environment or a change in the use environment, is not performed.

In many cases, a conventional business environment is an intranet environment in a company. In recent years, with the diversification of working environments, cases of working at home or in public spaces have increased. With a change in the working environment, cases where business usage of an information device outside of a company have increased.

Conventionally, a security administrator takes security measures for a group of information devices to be used and a network to which the information devices are connected, thereby providing a safe business environment to employees. In such an environment, even if the encryption method of the wireless LAN used by the information device is a non-recommended protocol, the risk can be reduced by the measures on the environment side.

For example, measures such as eliminating the risk of wiretapping by controlling the coverage of radio waves and strictly managing the room entry are taken. In the case where the version upgrade cycle of an industrial device used in a company is long and the enhancement of encryption of the industrial device itself cannot be expected, such measures on the environment side are actually available choices.

In a work-at-home environment, a security administrator may be able to check the security by utilizing some security software or the like, but an employee who is the user of an information processing apparatus is basically responsible for security measures. Although companies may provide security education of the employees, it is difficult for the user to analyze threats at a level comparable to that of security administrators. Since employees responsible for security are rarely specialized in security, there are few cases where efforts to reduce risks on the environment side, such as those performed by companies, can be performed, and there is a high possibility that the employees are not aware of the risks in the first place. Further, in the work-at-home environment, it is often difficult to control the coverage of radio waves from the viewpoint of the confined site area and the shielding property of house building materials against radio waves.

SUMMARY

The present disclosure is directed to providing an appropriate notification mechanism in consideration of the use environment of an information processing apparatus.

According to an aspect of the present disclosure, an information processing apparatus that performs wireless communication with an external apparatus includes one or more memories, and one or more processors in communication with the one or more memories, wherein the one or more memories and the one or more processors are configured to receive selection of one environment from a plurality of environments as a use environment of the information processing apparatus, and perform notification of a warning regarding a setting of wireless communication, in a case where the selected environment is one of predetermined environments and the setting with a relatively low security strength among settings for encryption processing for the wireless communication is set, and not to perform the notification of the warning in a case where the predetermined environment is not selected, wherein the predetermined environments include a work-at-home environment, a co-working space environment, a shared office environment, and a Wi-Fi® hot spot environment.

Further features of the present disclosure will become apparent from the following description of exemplary embodiments with reference to the attached drawings.

BRIEF DESCRIPTION OF THE DRAWINGS

FIG. 9 is a flowchart illustrating a process performed by the MFP according to the present disclosure.

DESCRIPTION OF THE EMBODIMENTS

Hereinafter, exemplary embodiments of the present disclosure will be described with reference to the drawings. The following exemplary embodiments do not limit the disclosure according to the appended claims, and all combinations of features described in the exemplary embodiments are not necessarily essential to the means for solving the problems of the disclosure. In the following exemplary embodiments, a multifunction peripheral (MFP) including a printer will be described as an example of an information processing apparatus. The information processing apparatus according to the present disclosure is not limited to an MFP, and may be, for example, a notebook PC, a tablet, or a smartphone.

In a first exemplary embodiment, an access point is selected on a wireless access point selection screen (not shown), and when communication with a low security level is detected after completion of network connection settings, a security notification is issued to the user in accordance with the use environment of the MFP.

Figure 1:
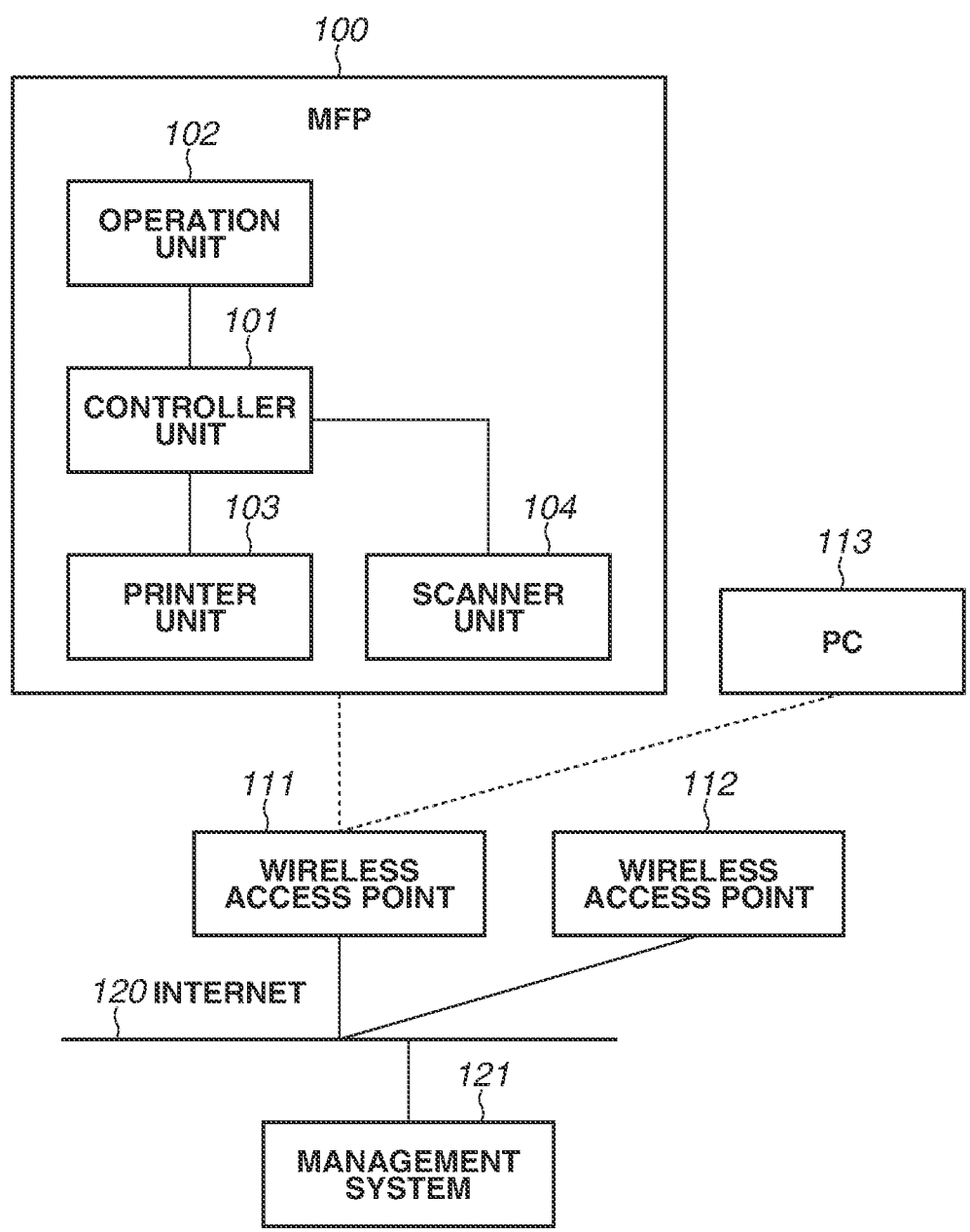
FIG. 1 is a block diagram illustrating a connection configuration of a multifunction peripheral (MFP) according to the present disclosure.

FIG. 1 is a block diagram illustrating a connection configuration of an MFP 100, a wireless access point 111, a personal computer (PC) 113, and a management system 121 according to the present disclosure. The MFP 100 is an example of an information processing apparatus according to the present disclosure. The MFP 100 and the PC 113 are connected via the wireless access point 111. Thus, the MFP 100 can perform wireless communication with the PC 113, which is an external apparatus. The wireless access point 111 and the management system 121 are connected via the Internet 120. In the present exemplary embodiment, a wireless access point 112 is an apparatus that is a target of the access point search but is not to be actually connected.

The MFP 100 includes an operation unit 102 that receives input and output from a user. The MFP 100 includes a printer unit 103 that outputs electronic data to a paper medium. The MFP 100 includes a scanner unit 104 that reads the paper medium and converts data thereon into electronic data. The operation unit 102, the printer unit 103, and the scanner unit 104 are connected to a controller unit 101, and implement a function as a multifunction peripheral under the control of the controller unit 101.

The PC 113 is a work terminal that transmits a print job to the MFP 100 or performs a remote operation of the MFP 100. Using wireless communication via the wireless access point 111, the MFP 100 can receive a print job from the PC 113 and transmit a scan data to the PC 113. The management system 121 is a device for checking information about the MFP 100 via the Internet 120.

Figure 2:
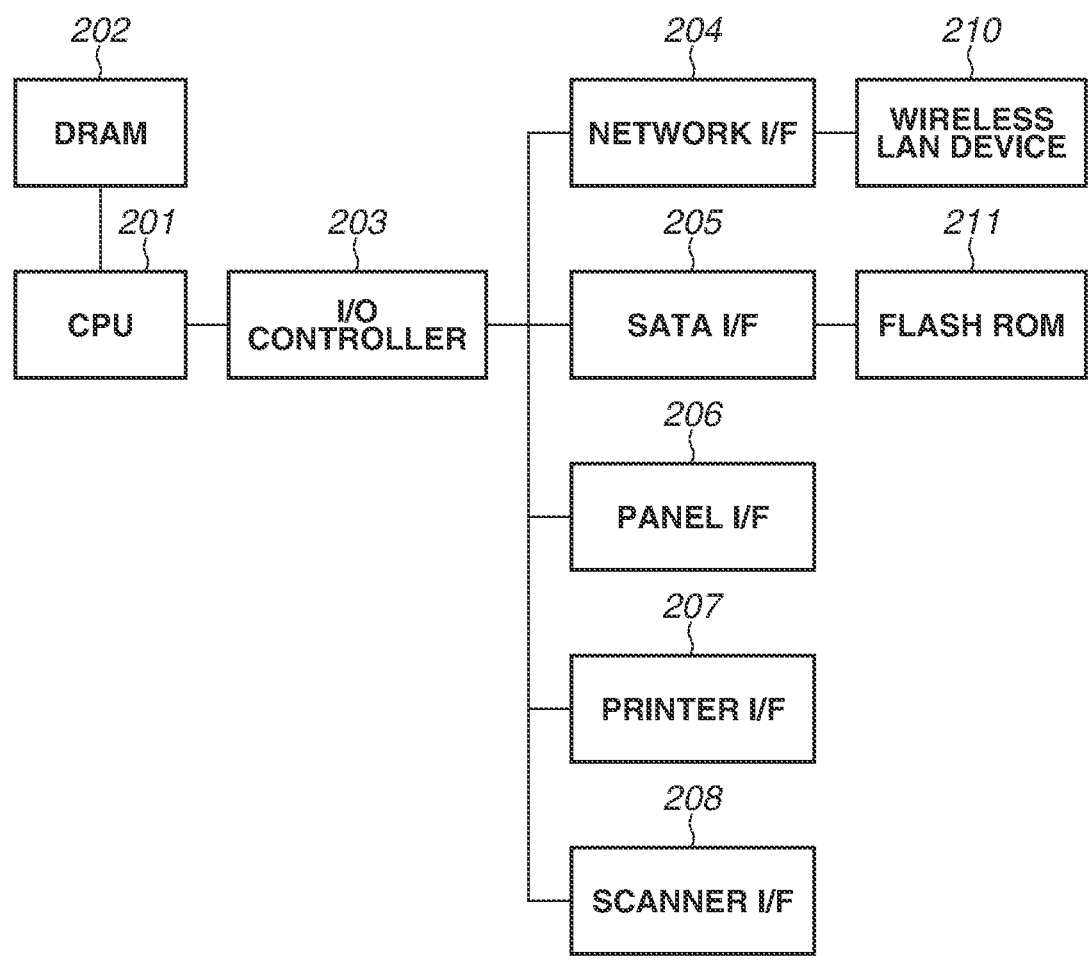
FIG. 2 is an internal configuration diagram of a controller unit of the MFP.

FIG. 2 is a block diagram illustrating details of the controller unit 101 of the MFP 100. A central processing unit (CPU) 201 performs main arithmetic processing in the controller unit 101. The CPU 201 is connected to a dynamic random access memory (DRAM) 202 via a bus. The DRAM 202 is used by the CPU 201 as a working memory for temporarily storing program data representing an operation instruction and process target data in the process of implementing the operation processing by the CPU 201. The CPU 201 is connected to an input/output (I/O) controller 203 via a bus. The I/O controller 203 performs input and output to and from various devices in accordance with an instruction from the CPU 201. A Serial Advanced Technology Attachment (SATA) interface (I/F) 205 is connected to the I/O controller 203, and a flash read-only memory (ROM) 211 is connected to the SATA OF 205. The CPU 201 uses the flash ROM 211 to permanently store programs and document files for implementing the functions of the MFP 100. A network OF 204 is connected to the I/O controller 203. A wireless LAN device 210 is connected to the network OF 204. The CPU 201 implements communication with the wireless access point 111 by controlling the wireless LAN device 210 via the network OF 204. A panel OF 206 is connected to the I/O controller 203, and the CPU 201 performs input and output for the user to and from the operation unit 102 via the panel OF 206. A printer OF 207 is connected to the I/O controller 203, and the CPU 201 performs processing for outputting a paper medium using the printer unit 103 via the printer OF 207.

Figure 3:
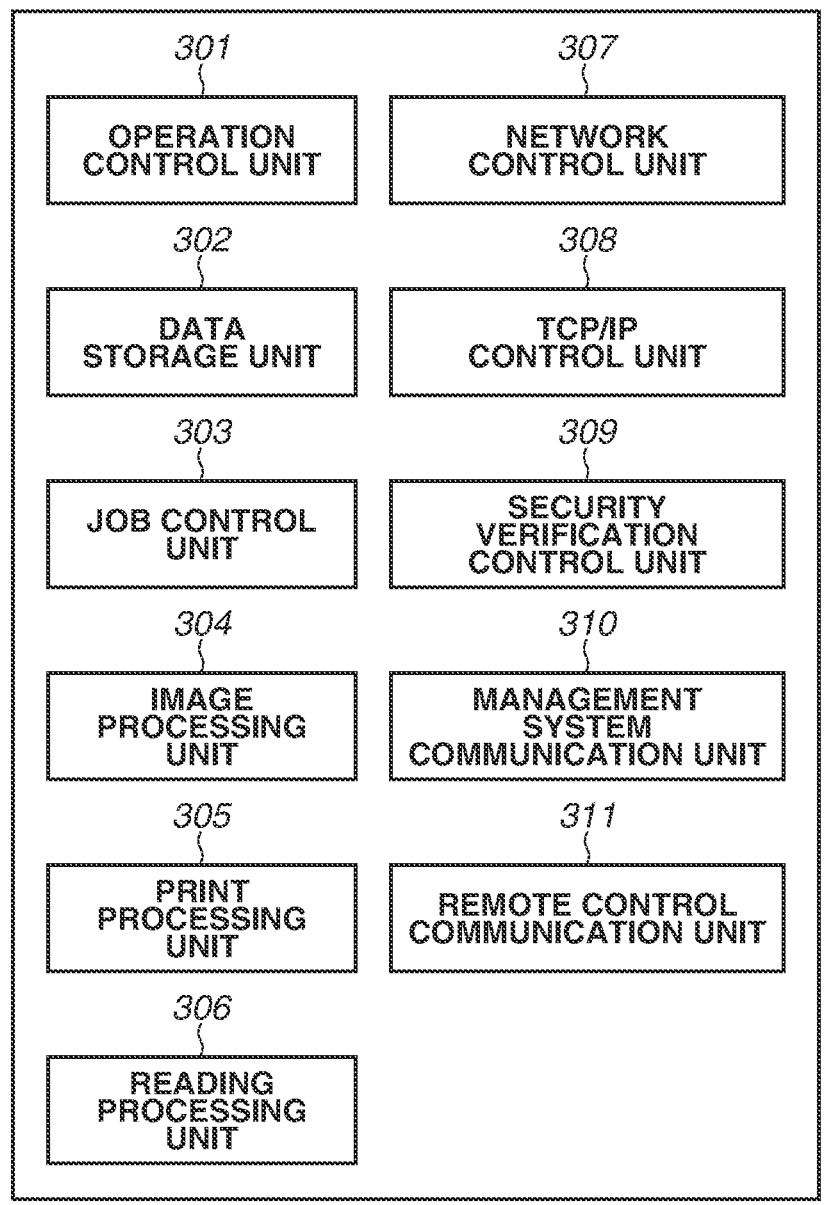
FIG. 3 is a block diagram of software executed in the controller unit of the MFP.

FIG. 3 is a block diagram illustrating the structure of software executed by the controller unit 101 of the MFP 100. All the software executed by the controller unit 101 is executed after the CPU 201 reads the program stored in the flash ROM 211 into the DRAM 202.

An operation control unit 301 displays a screen image for a user on the operation unit 102, and executes processing associated with detection of a user operation and a screen component such as a button displayed on the screen. In response to a request from another control unit, a data storage unit 302 stores data in the flash ROM 211 and reads the data. For example, when the user wants to change some device settings, the operation control unit 301 detects a content input to the operation unit 102 by the user, and the data storage unit 302 stores the content in the flash ROM 211 as a setting value in response to a request from the operation control unit 301.

A job control unit 303 controls job execution in accordance with an instruction from another control unit. An image processing unit 304 processes image data into a format suitable for each application in accordance with an instruction from the job control unit 303. A print processing unit 305 prints and outputs an image on a paper medium via the printer OF 207 in accordance with an instruction from the job control unit 303. A reading control unit 306 reads a placed document via a scanner I/F 208 in accordance with an instruction from the job control unit 303.

A network control unit 307 performs a network setting, such as an IP address to be used for connection to a wireless access point and, on a Transmission Control Protocol/Internet Protocol (TCP/IP) control unit 308 at the time of system activation or when a setting change is detected, in accordance with a setting value stored in the data storage unit 302. The setting values stored in the data storage unit 302 include, for example, information such as a service set identifier (SSID), an encryption method, and a Pre-Shared Key (PSK) required for connection to a wireless LAN access point. As for the SSID and the encryption method, the MFP 100 stores the SSID and the encryption method corresponding to the access point selected by the user on the wireless access point selection screen (not shown) in the data storage unit 302. Here, the wireless access point selection screen (not shown) displays an access point corresponding to a signal received by the MFP 100 and transmitted by the wireless access point to the device before connection. Instead of selecting a wireless access point, the user may manually input, from the operation unit 102, information notified in advance by an administrator of the wireless access point. In this case, the MFP 100 stores information about the SSID and the encryption method manually input by the user in the data storage unit 302. As for the PSK, the user inputs information notified in advance by the administrator of the wireless access point, and the MFP 100 stores the input PSK information in the data storage unit 302.

The TCP/IP control unit 308 transmits and receives a network packet via the network OF 204 in accordance with an instruction from another control unit.

A security verification control unit 309 detects that the network control unit 307 has connected to a wireless access point, and performs security verification. If the verification result requires a user notification, the verification result is notified to the operation unit 102, the management system 121, and the PC 113 via the operation control unit 301, a management system communication unit 310, and a remote control communication unit 311, respectively. For later reference, the data is also recorded in the data storage unit 302 as a log. A specific process of the security verification will be described below with reference to FIG. 7.

The management system communication unit 310 performs control for transmitting various kinds of information to the management system 121 via the network control unit 307.

The remote control communication unit 311 performs control for responding to an operation and a display request from the PC 113 via the network control unit 307. As a result, the user can operate the MFP 100 from a remote PC without being in front of the MFP 100.

Figure 4A:
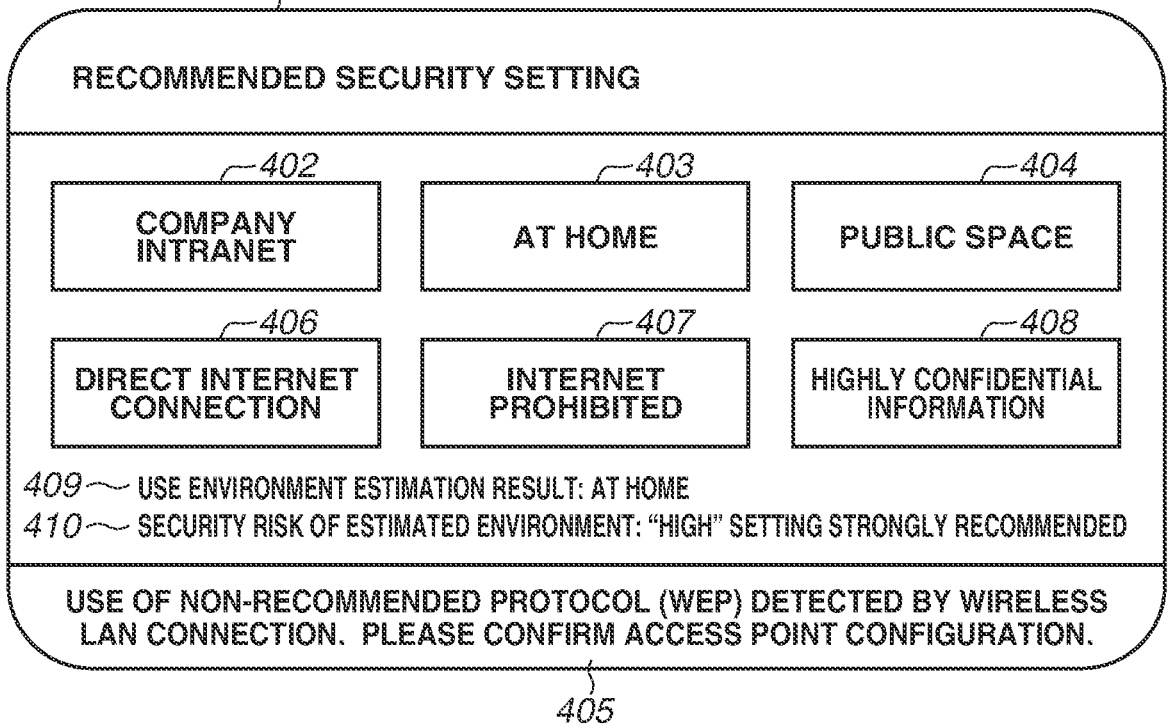
FIGS. 4A and 4B are exemplary screen configurations relating to use environment setting functions of the present disclosure.
Figure 4B:
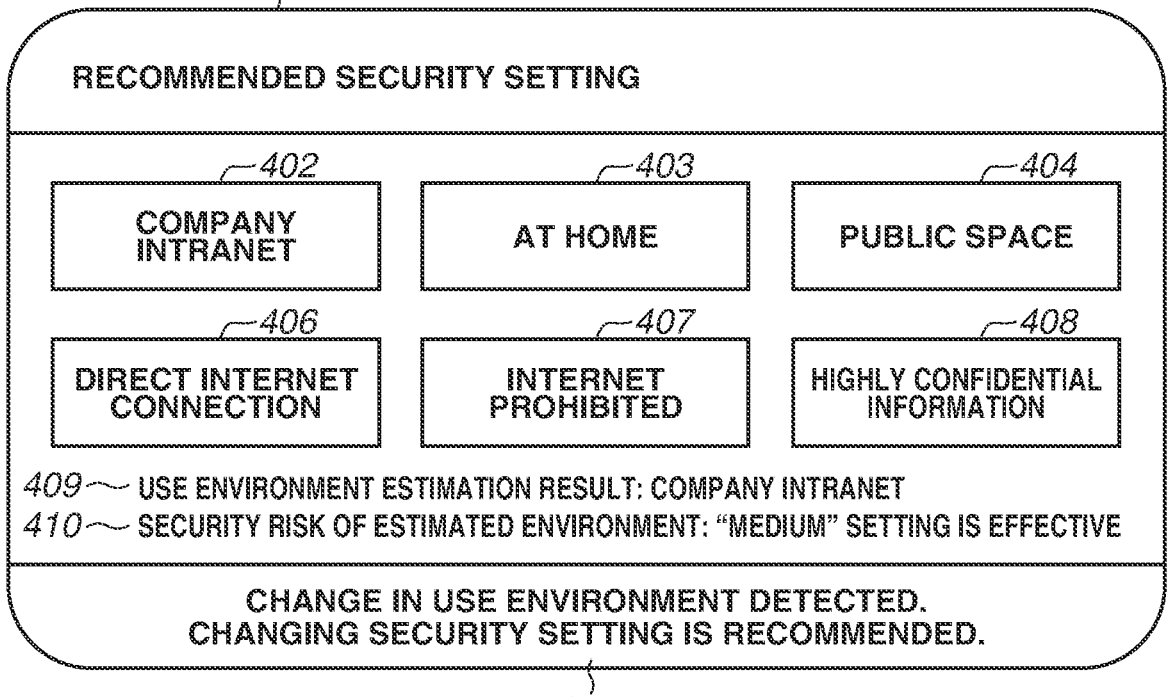

FIGS. 4A and 4B illustrate a recommended security setting screen 401 displayed on the operation unit 102. This screen is used to collectively set the security settings associated with the use environment by selecting the use environment. When the user instructs the display of the recommended security setting screen 401 from a menu screen (not illustrated), the recommended security setting screen 401 is displayed. A company intranet button 402 is selected when the use environment is intranet. An at home button 403 is selected when the use environment is expected to be a work-at-home environment. A public space button 404 is selected when the use environment is a public space. A direct Internet connection button 406 is selected when the use environment is the Internet direct connection environment. An Internet prohibited button 407 is selected when the use environment is an Internet prohibited environment. A highly confidential information button 408 is selected when the use environment is a highly confidential information environment. A button information notification portion 405 is an area for displaying a message when there is information to be notified to the user by the MFP 100. FIG. 4A illustrates an example of a notification when the use of a non-recommended protocol, which will be described below, is detected in the wireless LAN connection. FIG. 4B is a notification example when a change in the use environment in which the information processing apparatus is used is detected. A use environment estimation result notification portion 409 is an area for notifying the use environment estimated from the network environment to which the MFP 100 is connected. A security risk notification portion 410 is an area for displaying information for notifying a security risk level of a network environment to which the MFP 100 is connected and for prompting a user who hesitates to perform security setting to perform the setting. FIG. 4A is a notification example in a case where a work-at-home environment is estimated as a use environment, and FIG. 4B is a notification example in a case where an intranet environment is estimated.

In order to perform collective setting using the recommended security setting screen 401, the data storage unit 302 stores a setting value group associated with each use environment. When one button is selected from among the buttons 402 to 404 and 406 to 408, a collective setting is performed on the plurality of setting items by using the setting value group associated with the use environment corresponding to the selected button. The plurality of setting items include, for example, security setting items related to a general system, for example, a network, such as a setting of transport layer security (TLS) related to encryption of communication, a setting of a personal firewall, and a setting of Server Message Block (SMB) related to file sharing. Further, for example, setting items related to security of the MFP 100, such as a function of automatically deleting a print job interrupted due to an error and a function of displaying a history of print jobs, are also included. Note that the plurality of setting items do not include a setting value corresponding to a setting for encryption processing used for wireless communication. In the present exemplary embodiment, the setting value corresponding to the setting related to the encryption processing is the value of the encryption method used for the wireless LAN connection. The detailed settings related to the encryption processing used in wireless communication include the settings for the authentication method, the encryption method, the encryption algorithm, and the key length, and at least one of these setting values may be set as a setting value corresponding to the settings related to the encryption processing.

Figure 5:
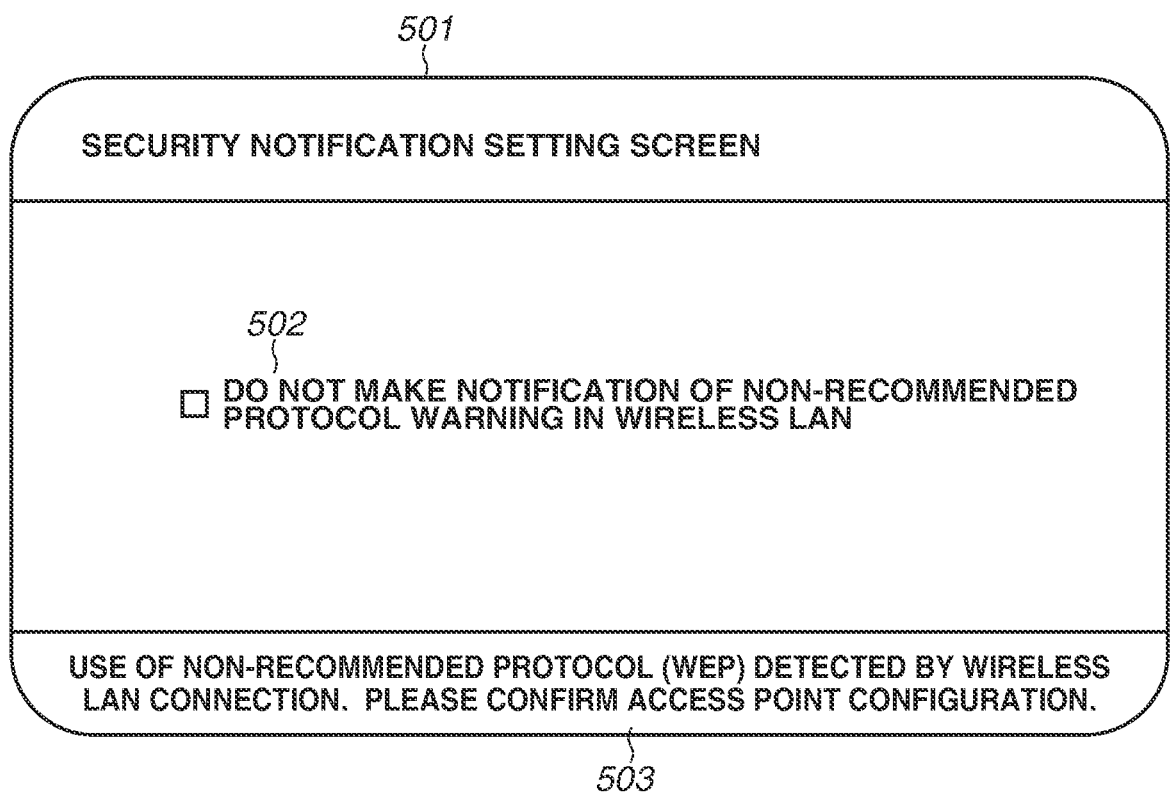
FIG. 5 is an exemplary screen configuration relating to a security notification function of the present disclosure.

FIG. 5 illustrates a security notification setting screen 501 displayed on the operation unit 102. This is a screen for the user to select whether to display the security notification. The security notification setting screen 501 is displayed when the user gives an instruction to display the security notification setting screen 501 from the menu screen (not illustrated). An information notification portion 503 is a message display area similar to the button information notification portion 405. A setting (i.e., do not make notification of non-recommended protocol warning in wireless LAN) 502 is used to set whether to make message notification on the button information notification portion 405 and the information notification portion 503 in step S1005 (to be described below) in a case where the use of the non-recommended protocol of the wireless LAN is detected in step S1001 (to be described below). When the setting 502 is selected by the user, the operation control unit 301 receives an instruction not to perform the message notification. The value set here is stored in data storage unit 302 and referred to in the process in step S1002 described below.

Figure 6:
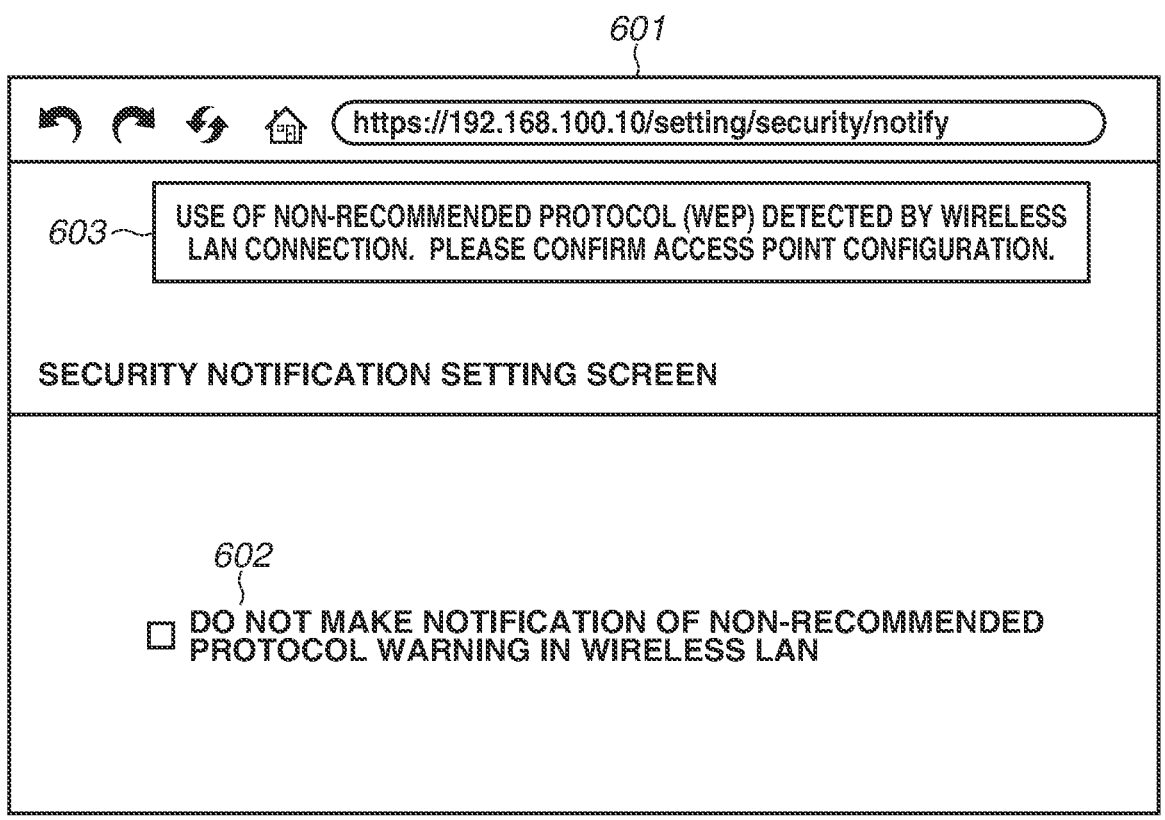
FIG. 6 is an exemplary screen configuration according to a remote control function of the present disclosure.

FIG. 6 illustrates a security notification setting screen 601 transmitted from the remote control communication unit 311 and displayed on a web browser operating on the PC 113. The security notification setting screen 601 is displayed when the user gives an instruction to display a recommendation screen, i.e., the security notification setting screen 601, from the menu screen (not illustrated). Functions to be provided are the same as those of the security notification setting screen 501, but the user can operate the screen from the PC 113 at hand without being in front of the MFP 100. An information notification portion 603 is a message display area. In a setting 602 by which the non-recommended protocol warning of the wireless LAN is not to be notified, similarly to the setting 502 by which the non-recommended protocol warning of the wireless LAN is not to be notified, whether to perform the message notification can be set. When the setting 602 is selected by the user, the PC 113 receives an instruction not to perform the message notification. The value set here is stored in data storage unit 302 and referred to in the process in step S1002 described below.

Figure 7:
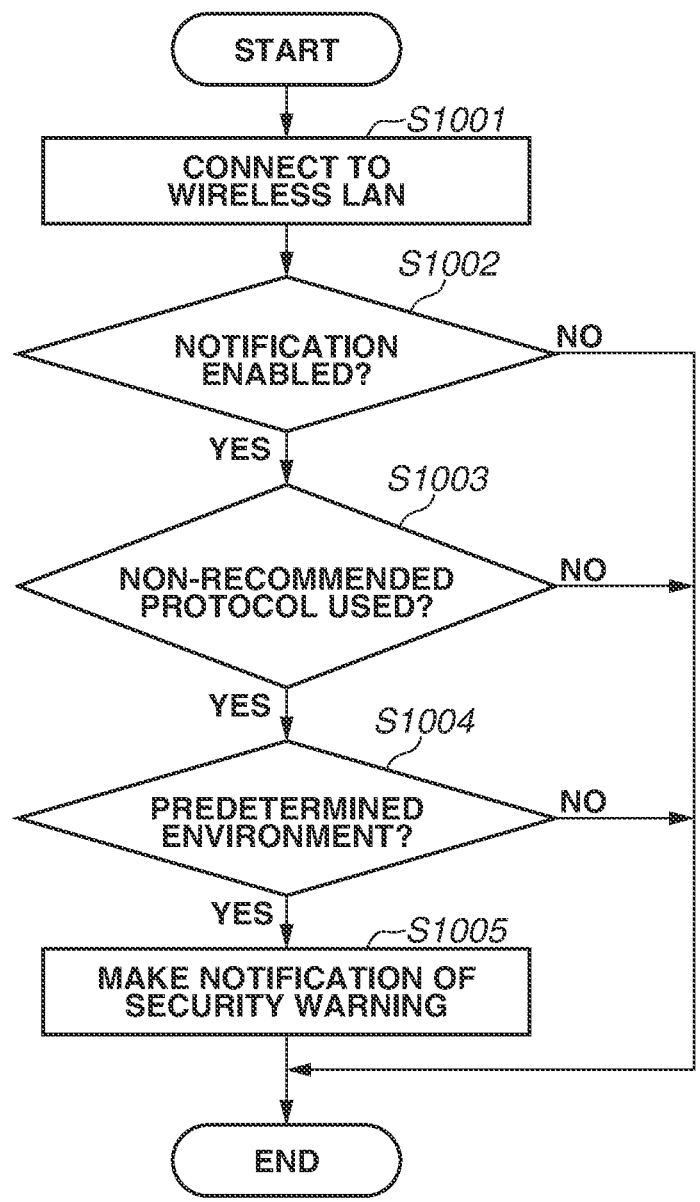
FIG. 7 is a flowchart illustrating a process performed by the MFP according to the present disclosure.

With reference to FIG. 7, a description will be given of a process in which the MFP 100 detects the use of the non-recommended protocol and notifies the user of the use. All the processing performed by the MFP 100 in FIG. 7 is executed as arithmetic processing of the DRAM 202 after the program recorded in the flash ROM 211 is read into the CPU 201.

This procedure is started at the time of activation of the MFP 100 or when the network setting is changed. In step S1001, the network control unit 307 connects to the wireless LAN based on network settings stored in the data storage unit 302. The network settings include, for example, information necessary for wireless LAN connection, such as the SSID, the encryption method, and the PSK of the wireless access point 111 to be connected.

In step S1002, the security verification control unit 309 identifies that the security notification is enabled. A value stored in the data storage unit 302, which is set by the user in the setting 502 for not notifying the non-recommended protocol warning of the wireless LAN or the setting 602 for not notifying the non-recommended protocol warning of the wireless LAN, is read out, and the security verification control unit 309 identifies whether to perform the notification. In a case where an instruction not to perform notification has been received on the security notification setting screen 501 or the security notification setting screen 601, the security verification control unit 309 determines that the setting for not performing notification has been made (NO in step S1002), and the processing of the present flowchart ends. That is, in this case, even when a relatively low security level is set in step S1003 and a predetermined environment is identified in step S1004, which will be described below, the flowchart ends without issuing a warning in step S1005. In a case where the instruction not to perform the notification is not received on the security notification setting screen 501 or the security notification setting screen 601, the security verification control unit 309 determines that the notification is set to be performed (YES in step S1002), and performs the process in step S1003.

In step S1003, the security verification control unit 309 determines whether the MFP 100 is using a non-recommended protocol. To be more specific, it is determined whether the encryption method used for the wireless LAN connection in step S1001 is a method that employs no encryption, WEP, or WPA™. In the present exemplary embodiment, methods that employ no encryption, WEP, and WPA™ are referred to as non-recommended protocols. In a case where the encryption method used for the wireless LAN connection in step S1001 employs no encryption (YES in step S1003), WEP, or WPA™, it is determined that the protocol is a non-recommended protocol, and step S1004 is performed. If the encryption method used for the wireless LAN connection in step S1001 is WPA2™ or WPA3™, it is determined that the protocol is not a non-recommended protocol (NO in step S1003), and the processing of this flowchart ends. In the present exemplary embodiment, an encryption protocol is identified in accordance with the current situation, but a specific non-recommended encryption protocol is updated in accordance with future analysis or advancement in encryption protocols, and thus the present technology is not limited to a specific encryption protocol. For example, a configuration may be adopted in which it is determined whether a setting with a relatively low security strength is made among the settings relating to the encryption processing used in wireless communication. As a setting with a relatively low security strength, it may be determined whether a setting for wireless communication without encryption or wireless communication using a non-recommended protocol has been made. In the present exemplary embodiment, the determination of step S1003 is performed based on the determination of whether the setting for performing wireless communication is one that employs no encryption or a non-recommended protocol, which corresponds to the encryption method that employs non-encryption, WEP, or WPA™. The detailed settings related to the encryption processing used in the wireless communication include the settings for the authentication method, the encryption method, the encryption algorithm, and the key length. A configuration may be adopted in which at least one of these settings is referred to, and it is determined whether wireless communication with a relatively low security level is set to be performed.

In step S1004, the security verification control unit 309 determines whether the use environment of the MFP 100 is a predetermined environment. In the present exemplary embodiment, the predetermined environment is an environment expected to be used for work at home. That is, in step S1004, the security verification control unit 309 determines whether the use environment of the MFP 100 is a work-at-home environment. The predetermined environment is not limited to an environment expected to be used for work at home. For example, the predetermined environment may be at least one of a work-at-home environment, an environment expected to be used in a co-working space or a shared office, and an environment in which connection to a Wi-Fi® hot spot is expected. In the present exemplary embodiment, the company intranet environment is not included in the predetermined environment. An environment to which management for preventing wiretapping within a reachable range of radio waves of wireless communication is applied, such as a company intranet environment, may not be the predetermined environment. Further, even if special management is not applied, the environment may not be the predetermined environment as long as the environment does not allow a third party to enter the coverage of radio waves and allows a setting with a relatively low security strength. That is, the predetermined environment may be an environment in which the user of the information processing apparatus should not be allowed to perform wireless communication by encryption processing in accordance with a setting having a relatively low security strength.

As a determination method, it is confirmed whether the use environment information selected on the recommended security setting screen 401 and stored in the data storage unit 302 is information indicating a work-at-home environment. There may be a case where the use environment is not set in the recommended security setting screen 401. In this case, it is determined that the use environment of the MFP 100 is not set to "at home". The most conceivable case where the recommended security setting screen 401 is not used is a case where there is an advanced security administrator who individually examines and sets detailed settings, and even in this case, too, it is considered that the security warning notification according to the present exemplary embodiment is unnecessary. In the present exemplary embodiment, six environments of company intranet, work-at-home, public space, direct connection to the Internet, prohibition of the Internet, and confidential information are exemplified, and the work-at-home environment is set as the predetermined environment and is set as the target of the security warning notification. However, as described above, an environment other than the work-at-home environment may be considered as the predetermined environment. For example, if the apparatus has an environment included in the predetermined environment such as a Wi-Fi® hot spot as an option of the use environment displayed on the recommended security setting screen 401, the environment is also a target for which the security warning notification is performed. Although it is conceivable that use environments that are not currently assumed will increase in the future, the predetermined environment in the present disclosure is not limited to a work-at-home environment, and may be an environment included in the above-described predetermined environment.

As a means for identifying the use environment, the network control unit 307 may be configured to estimate the use environment from the tendency of packets that are transmitted and received. For example, as a communication tendency unique to a work-at-home network, there is a feature owing to a home router. Specifically, in a home router, a configuration in which the same device serves as a Dynamic Host Configuration Protocol (DHCP) server and a default gateway is common, but there is almost no such configuration in an in-house network. It is possible to estimate the use environment with a certain degree of accuracy based on such a tendency. A security verification control unit 309 receives a selection result of an environment estimated from a plurality of environment choices, and identifies the use environment of the MFP 100.

If the use environment of the MFP 100 is the predetermined environment (YES in step S1004), the processing proceeds to step S1005, and if not (NO in step S1004), the processing in this flowchart ends. In step S1005, the user is notified of a security warning. Four notification means are used for the security warning. First, the operation control unit 301 makes massage notification on the button information notification portion 405 or the information notification portion 503 on the operation unit 102 that the non-recommended protocol is used. Further, the management system communication unit 310 transmits, to the management system 121, a notification indicating that the MFP 100 is using the non-recommended protocol. Upon receiving the notification, the management system 121 displays the received notification on a management system browsing screen for the web browser operated by the user. In addition, the remote control communication unit 311 transmits a notification indicating that the non-recommended protocol is used to the PC 113, which is an external apparatus. Upon receiving the notification, the PC 113 displays the notification on the information notification portion 603 on the web browser displayed on the PC 113. In addition, the security verification control unit 309 records the notification that the MFP 100 is using the non-recommended protocol, that is, the determination result in step S1003, in the data storage unit 302 for later reference as a security log. This log may be separately transmitted to a Security Information and Event Management (STEM) server as a security log. In the above four methods, the user is notified that the MFP 100 is using a non-recommended protocol.

According to the above-described procedure, in a case where the wireless communication of the information processing apparatus is set so as to use encryption processing with a relatively low security strength, notification control can be performed so as to issue a warning in consideration of the use environment of the information processing apparatus. Accordingly, the user in the work-at-home environment can recognize the security risk. If the use environment of the information processing apparatus is not taken into consideration, an unnecessary warning is displayed even for a user who does not need the notification, for example, a user who has already reduced the security risk by a measure on the environment side, such as a company intranet. According to the present disclosure, for example, convenience is improved by eliminating unnecessary notification for a user in a company intranet environment that does not require the warning. The security notification setting screen 501, the security notification setting screen 601, and step S1002 may be omitted.

Further, as illustrated in FIG. 4, the operation control unit 301 may display the use environment identified by the estimation described in step S1004 on the recommended security setting screen 401. Since the estimation of the use environment is based on the tendency of packets that are transmitted and received, the network control unit 307 may execute the estimation processing at an arbitrary timing at which the environment of the network to be connected may change, in addition to the start of the wireless LAN. For example, the timing includes when a wired LAN is started, a network setting is changed, or the MFP 100 is activated. The network control unit 307 may execute the estimation processing at a timing at which the user wants to see the estimation result. For example, the timing is when the recommended security setting screen 401 is displayed, or when a use environment estimation start button (not shown) displayed on the recommended security setting screen 401 is pressed. When the network control unit 307 performs the estimation process and the use environment indicated by the estimation result is obtained, the operation control unit 301 may display the use environment on the recommended security setting screen 401.

In addition, by storing the security level corresponding to the use environment in the MFP 100 in advance, it is possible to identify the security risk level of the use environment from the estimation result of the use environment. For example, in a case where the use environment is the company intranet, it can be estimated that the security administrator blocks communication on the network side or thoroughly manages entrance to a building, and thus the security risk level of the use environment is considered to be relatively low or medium. In addition, in a case where the use environment is a work-at-home environment, since it can be estimated that communication is not blocked or strict room entry management is not performed, it is considered that the security risk level of the use environment is relatively high. As described above, the security risk level corresponding to the use environment is determined in advance by a vendor, and the use environment and the security risk level are stored in the data storage unit 302 in association with each other. In a case where the network control unit 307 estimates that the use environment is the company intranet environment, the network control unit 307 identifies the security risk level as "medium". In a case where the network control unit 307 estimates that the use environment is work-at-home environment, the network control unit 307 identifies the security risk level as "high". In this way, the network control unit 307 may identify the security risk level of the use environment from the estimation result of the use environment.

Note that, in the case of a public space environment, it can be estimated that communication is not blocked and strict entry management is not performed. Therefore, the security risk level is set to "high" as in the case of the work-at-home environment. The security risk level of the direct Internet connection environment is also set to "high". In a highly confidential information environment, it can be estimated that a security manager blocks communication on the network side or thoroughly manages entrance to a building. Therefore, the security risk level is set to "medium" as in the case of the company intranet environment. Since the Internet prohibited environment is an environment isolated from a different network, the security risk level is set to "low". In this way, information in which the use environment and the security risk level are associated with each other is stored in the data storage unit 302. When the network control unit 307 estimates the use environment, the network control unit 307 identifies the security risk level corresponding to the environment obtained as the estimation result.

In accordance with the security risk level identified by the network control unit 307, the operation control unit 301 may cause the button information notification portion 405 to display a message prompting the user to make settings. For example, in a case where the security risk level corresponding to the estimated use environment is high, the operation control unit 301 performs display indicating that the setting is strongly recommended even at the cost of convenience since the environment has a particularly high risk. In a case where the security risk level corresponding to the estimated use environment is low, the operation control unit 301 performs a display indicating that the setting is recommended if possible because there is a certain effect although the environment is not an environment having a particularly high risk.

Because there is a possibility that the setting and measures for security deteriorate convenience, a user sometimes hesitates to perform the security setting and end up not performing the security setting. By displaying the security risk level or a message corresponding to the security risk level, a user who hesitates to perform the setting can be prompted to perform the setting.

The operation control unit 301 may switch the presence or absence of the display for prompting the setting according to the security risk level depending on the use environment. For example, the operation control unit 301 may not perform the display in a case where it is estimated that the security risk level is relatively low, i.e., a company intranet, and may perform the display in a case where it is estimated that the security risk level is high, i.e., at home. In addition, instead of switching the presence or absence of display according to the use environment, the configuration may be such that the content to be notified is switched. For example, the operation control unit 301 also makes a notification when the use environment is an intranet environment, and then makes a notification that there is no problem if a measure has been taken, and makes a notification that a measure is strongly recommended if the use environment is a work-at-home environment.

When the estimation result of the use environment changes from the estimation result at the previous estimation time point, the operation control unit 301 may display, on the button information notification portion 405, a message indicating that the security setting should be reviewed because the use environment has changed. At this time, even when there is no change in the estimation result, the operation control unit 301 may exceptionally display that the security setting should be reviewed. For example, in a case where the SSID of the wireless access point has changed, even when there is no change in the estimation result, there is a possibility that the use environment has changed as a result of connecting to a point other than the wireless access point 111, and thus the exceptional display is effective. The same applies to a case where the physical address of the connected gateway changes. Further, in a case where the selection of the use environment by the recommended security setting screen 401 and the security setting associated with the selection operation are not performed, the user has postponed the setting operation. Accordingly, even when there is no change in the estimation result, an exceptional display for prompting the setting is effective.

In a case where the estimation result of the use environment changes, it is necessary to review the security setting. Therefore, the MFP 100 detects and notifies the change in the estimation result of the use environment, and thus it is possible to prevent the user from forgetting to review the security setting. However, in a case where the notification is displayed only at the timing when the estimation result of the use environment changes, the security setting cannot be appropriately reviewed if the user does not have time to perform the security setting corresponding to the estimation result of the use environment on the spot. In addition, even in a case where the notification is displayed only at the timing when the estimation result of the use environment changes, the notification is not performed in a case where the estimation results of the use environments coincide with each other by chance, and thus the user cannot appropriately review the security setting. The MFP 100 can appropriately prompt the user to review the security setting by performing the exceptional display as described above.

The detection and notification of a change in the use environment may be performed at any timing when the use environment estimation processing is executed. Further, the detection and notification of a change in the use environment may be performed at a timing when the user wants to know a change in the use environment, such as when the recommended security setting screen 401 is displayed or when the use environment estimation start button (not shown) is pressed. Further, the operation control unit 301 may be configured not to display that the security setting should be reviewed in a case where it is determined that the use environment is a highly confidential information environment based on the estimation result of the use environment.

Hereinafter, a second exemplary embodiment of the present disclosure will be described with reference to the drawings. In the first exemplary embodiment, when communication with low security strength is detected after the user selects an access point and the setting related to network connection is completed, security notification is performed in consideration of the use environment of the MFP 100. In the present exemplary embodiment, a use procedure in which a user selects and changes a wireless access point after one use environment of the MFP 100 is identified will be described. The configurations of FIGS. 1, 2, 3, 4, 5, and 6 are the same as those of the first exemplary embodiment.

Figure 8:
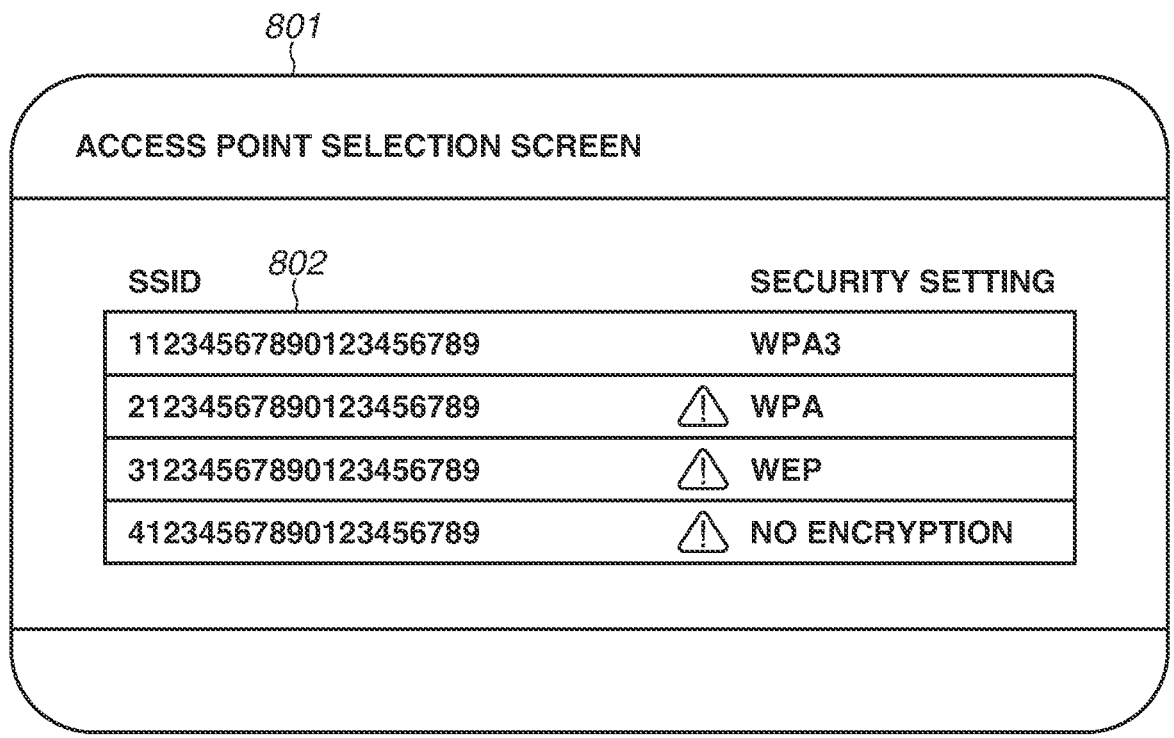
FIG. 8 is a screen configuration relating to a wireless local area network (LAN) access point selection function of the present disclosure.

FIG. 8 illustrates an access point selection screen 801 displayed on the operation unit 102. When a wireless access point is searched for from the MFP 100, in a wireless access point selection area 802, the detected wireless access point is displayed in a list form and identified by the SSID. Although a screen example in which four access points are found is presented for easy understanding of the description, two access points, namely, the wireless access point 111 and the wireless access point 112 are displayed in a list in the case of the system configuration illustrated in FIG. 1. The user can designate an access point to be connected by selecting one of the access points displayed in the list by tapping the screen. When the operation control unit 301 receives the selection of the access point, information about the selected access point is stored in the data storage unit 302. The information is used when a wireless LAN connection is started. The information about the access point is specifically information such as a necessary SSID, an encryption method, and a PSK. Each access point has a security setting attribute, which indicates an encryption method supported by the access point. On the access point selection screen 801, options for a predetermined access point are displayed together with an icon indicating a warning for calling attention.

In the present exemplary embodiment, the predetermined access point is an access point whose encryption method is one of no encryption, WEP, and WPA™ In the present exemplary embodiment, these access points are also referred to as access points corresponding to non-recommended protocols. The predetermined access point is not limited to an access point whose encryption method is one of no encryption, WEP, and WPA™. As described in the first exemplary embodiment, in the present exemplary embodiment, the encryption protocol is identified according to the current situation, but a specific non-recommended encryption protocol is updated according to future analysis or advancement in the encryption protocol. Therefore, the predetermined access point may be an access point having a setting with a relatively low security strength among the settings for the corresponding encryption processing. As a setting with a relatively low security level, the access point may be set to perform wireless communication without encryption or wireless communication using a predetermined protocol.

In the present exemplary embodiment, only warning is performed and selection of the predetermined access point is left to the user, but another configuration may be adopted as long as display control for inhibiting selection of the predetermined access point by the user is performed. For example, the access point may be configured not to be selectable. The warning may include not only an icon but also a sentence indicating a non-recommended protocol. Alternatively, the option of the access point corresponding to the non-recommended encryption protocol may be hidden.

Processing for identifying access point list information to be displayed on the access point selection screen 801 by the MFP 100 will be described with reference to FIG. 9. All the processing performed by the MFP 100 in FIG. 9 is executed as arithmetic processing of the CPU 201 after the program recorded in the flash ROM 211 is read into the DRAM 202.

The procedure starts when the operation control unit 301 detects a screen operation performed by the user and displays the access point selection screen 801 on the operation unit 102. In step S2001, the MFP 100 scans for access points. The wireless LAN device 210 receives a radio signal emitted from a wireless access point in the vicinity and interprets the radio signal to identify the SSID and the security setting of the wireless access point.

In step S2002, the security verification control unit 309 identifies that the security notification is enabled. A value which is set by the user in the setting 502 for not notifying a non-recommended protocol warning of the wireless LAN or the setting 602 for not notifying a non-recommended protocol warning of the wireless LAN and stored in the data storage unit 302 is read out, and it is identified whether to perform notification. If the setting is to perform the notification (YES in step S2002), the process of step S2003 is performed, and if the setting is not to perform the notification (NO in step S2002), the process of step S2005 is performed.

In step S2003, the security verification control unit 309 determines whether the use environment of the MFP 100 is a predetermined environment. In the present exemplary embodiment, the predetermined environment is an environment expected to be used for work at home. The predetermined environment is not limited to the environment expected to be used for work at home. Other examples applicable to the predetermined environment are the same as those in the first exemplary embodiment, and a description thereof will be omitted.

As a determination method, it is confirmed whether the use environment information selected on the recommended security setting screen 401 and stored in the data storage unit 302 is information indicating a work-at-home environment. As in the first exemplary embodiment, as a method for determining the use environment of the MFP 100, the network control unit 307 may be configured to estimate the use environment based on the tendency of packets that are transmitted and received. If the use environment of the MFP 100 is a work-at-home environment (YES in step S2003), the process of step S2004 is performed, and if not (NO in step S2003), the process of step S2005 is performed.

In step S2004, the MFP 100 marks the access point corresponding to the non-recommended protocol. If the encryption method included in the security setting for each access point identified in step S2001 is no encryption, WEP, or WPA™, the access point is identified as an access point corresponding to a non-recommended protocol. More specifically, in this marking process, access point list data to be displayed for the user in a later process is generated and temporarily placed at the DRAM 202. At this time, data representing an access point identified as an access point corresponding to a non-recommended protocol is stored as additional information for the access point.

In step S2005, the MFP 100 presents a list of access points on the access point selection screen 801. At this time, the access point identified as the access point corresponding to the non-recommended protocol in step S2004 is displayed together with a warning for calling attention. The display method is not limited to the display with the warning for calling attention, and a display method different from the option not corresponding to the non-recommended protocol may be performed. For example, the option corresponding to the non-recommended protocol may be displayed in a non-selectable state, or the option may be hidden.

In the present exemplary embodiment, the predetermined access point which is marked in step S2004 and displayed together with the warning in step S2005 is an access point corresponding to encryption method employing no encryption, WEP, or WPA™ but is not limited thereto. As described above, the predetermined access point may be an access point having a setting with a relatively low security strength among the settings for the corresponding encryption processing. As a setting with a relatively low security strength, the access point for wireless communication without encryption or wireless communication using a predetermined protocol may be set.

According to the above procedure, the user in the work-at-home environment can recognize the security risk at the time of selecting the access point after identifying the use environment. Further, for example, there is also an effect that convenience is improved by eliminating unnecessary notification for a user in a company intranet environment that does not require the warning. The security notification setting screen 501, the security notification setting screen 601, and step S2002 may be omitted.

OTHER EMBODIMENTS

The present disclosure can also be implemented by processing in which a program for implementing one or more functions of the above-described exemplary embodiments is supplied to a system or an apparatus via a network or a storage medium, and one or more processors in a computer of the system or the apparatus read and execute the program. Further, the present disclosure can also be implemented by a circuit (for example, an application specific integrated circuit (ASIC) or a Field Programmable Gate Array (FPGA) that implements one or more functions.

According to the information processing apparatus of the present disclosure, it is possible to provide an appropriate notification mechanism in consideration of the use environment of the information processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-126814, filed Aug. 9, 2022, and No. 2023-085181, filed May 24, 2023, which are hereby incorporated by reference herein in their entirety.

What is claimed is:

1. An information processing apparatus that performs wireless communication with an external apparatus, comprising:
   one or more memories; and
   one or more processors in communication with the one or more memories,
   wherein the one or more memories and the one or more processors are configured to:
   receive selection of one environment from a plurality of environments as a use environment of the information processing apparatus; and
   perform notification of a warning regarding a setting of wireless communication, in a case where the selected environment is included in one or more predetermined environments and the setting with a relatively low security strength among settings for encryption processing for the wireless communication is set, and not to perform the notification of the warning in a case where the selected environment is not included in the one or more predetermined environments,
   wherein the one or more predetermined environments include at least one of a work-at-home environment, a co-working space environment, a shared office environment, and a Wi-Fi® hot spot environment.

2. The information processing apparatus according to claim 1,
   wherein the setting with the relatively low security strength is an unencrypted wireless communication or wireless communication using a predetermined protocol, and
   wherein the predetermined protocol includes Wired Equivalent Privacy (WEP) and Wi-Fi Protected Access® (WPA™).

3. The information processing apparatus according to claim 1,
   wherein a setting value group associated with the selected environment is set for a plurality of setting items of the information processing apparatus, and
   wherein the setting value group does not include a setting value corresponding to a setting related to the encryption processing.

4. The information processing apparatus according to claim 1, wherein the one or more processors and the one or more memories are further configured to estimate the use environment of the information processing apparatus,
   wherein the selection of the environment is based on the estimation.

5. The information processing apparatus according to claim 1, wherein the one or more processors and the one or more memories are further configured to receive an instruction not to perform the notification of the warning such that the notification of the warning is not performed even in a case where the relatively low security strength is set.

6. The information processing apparatus according to claim 1,
   wherein the setting related to the encryption processing includes at least one of setting of an authentication method, an encryption method, an encryption algorithm, and a key length.

7. The information processing apparatus according to claim 1, wherein the notification is performed via an operation unit of the information processing apparatus or an operation unit of the external apparatus.

8. The information processing apparatus according to claim 1, wherein in a case where the selected environment is included in the one or more predetermined environments and the setting of the relatively low security strength is set, the information processing apparatus stores that the setting of the relatively low security strength is set.

9. The information processing apparatus according to claim 1, wherein the information processing apparatus is an image processing apparatus including at least one of a scanner and a printer, and executes processing related to at least one of the scanner and the printer with the external apparatus by using the wireless communication.

10. The information processing apparatus according to claim 1,
wherein the one or more processors and the one or more memories are further configured to:
estimate the use environment, and
perform notification of a security risk level of the environment based on the estimated use environment.

11. The information processing apparatus according to claim 1,
wherein the one or more processors and the one or more memories are further configured to:
estimate the use environment, and
perform notification in a case where the estimated use environment has changed, and
perform notification in a case where a service set identifier (SSID) of a wireless access point to be connected or a physical address of the gateway to be connected changes, even when the estimated use environment is not changed.

12. The information processing apparatus according to claim 1,
wherein the one or more processors and the one or more memories are further configured to:
estimate the use environment,
perform notification when the use environment has changed, and
perform notification based on the estimation in a case where the environment is not selected even when the estimated use environment is not changed.

13. An information processing apparatus that performs wireless communication with an external apparatus, comprising:
one or more memories; and
one or more processors in communication with the one or more memories,
wherein the one or more memories and the one or more processors are configured to:
receive selection of one environment from a plurality of environments as a use environment of the information processing apparatus; and
provide a screen for receiving selection of an access point from a user in order to perform the wireless communication,
wherein, in a case where the selected environment is included in one or more predetermined environments, control is performed to perform display for inhibiting selection of a predetermined access point on the screen,
wherein the one or more predetermined environments include at least one of work-at-home environment, a co-working environment, a shared office environment, and Wi-Fi® hot spot, and
wherein the predetermined access point has a setting with a relatively low security strength among settings related to encryption processing of wireless communication corresponding to the access point.

14. The information processing apparatus according to claim 13, wherein as the display for inhibiting selection of the predetermined access point, an option corresponding to the predetermined access point is hidden the option is displayed but selection of the option is disabled, or the option is displayed together with a warning.

15. A method for controlling an information processing apparatus that performs wireless communication with an external apparatus, the method comprising:
receiving selection of one environment from a plurality of environments as a use environment of the information processing apparatus;
performing notification of a warning regarding a setting for wireless communication in a case where the one environment selected in the receiving is included in one or more predetermined environments and the setting with a relatively low security strength is set among settings for encryption processing to be used for wireless communication; and
performing control not to perform the notification of the warning in a case where the selected environment is not included in the one or more predetermined environments,
wherein the one or more predetermined environments include at least one of a work-at-home environment, a co-working space environment, a shared office environment, and a Wi-Fi® hot spot environment.

16. A method for controlling an information processing apparatus that performs wireless communication with an external apparatus, the method comprising:
receiving selection of one environment from a plurality of environments as a use environment of the information processing apparatus;
providing a screen for receiving a selection of an access point from a user in order to perform the wireless communication; and
performing control to perform display for inhibiting selection of a predetermined access point on the screen in a case where the one environment selected in the receiving is included in one or more predetermined environments,
wherein the one or more predetermined environments include at least one of a work-at-home environment, a co-working space environment, a shared office environment, and a Wi-Fi® hot spot environment,
wherein the predetermined access point has a setting with a relatively low security strength among settings related to encryption processing of wireless communication corresponding to the access point.

17. A non-transitory storage medium storing a computer program for executing a control method of an information processing apparatus that performs wireless communication with an external apparatus, the method comprising:
receiving selection of one environment from a plurality of environments as a use environment of the information processing apparatus;
performing notification of a warning regarding a setting for wireless communication in a case where the one environment selected in the receiving is included in one or more predetermined environments and the setting with a relatively low security strength is set among settings for encryption processing to be used for wireless communication; and
performing control not to perform the notification of the warning in a case where the selected environment is not included in the one or more predetermined environments,
wherein the one or more predetermined environments include work-at-home environment, a co-working space environment or a shared office environment, a Wi-Fi® hot spot environment.

18. A non-transitory storage medium storing a computer program for executing a control method of an information processing apparatus that performs wireless communication with an external apparatus, the method comprising:
- receiving selection of one environment from a plurality of environments as a use environment of the information processing apparatus;
- providing a screen for receiving a selection of an access point from a user in order to perform the wireless communication;
- performing control to perform display for inhibiting selection of a predetermined access point on the screen in a case where the one environment selected in the receiving is included in one or more predetermined environments,
- wherein the one or more predetermined environments include at least one of a work-at-home environment, a co-working space environment, a shared office, and a Wi-Fi® hot spot environment, and
- wherein the predetermined access point has a setting with a relatively low security strength among settings related to encryption processing of wireless communication corresponding to the access point.

* * * * *